(12) United States Patent
De Dios Martín

(10) Patent No.: US 10,522,939 B2
(45) Date of Patent: Dec. 31, 2019

(54) COVER ASSEMBLY FOR A TELECOMMUNICATIONS CONNECTOR

(71) Applicant: CommScope Connectivity Spain, S.L., Alcobendas, Madrid (ES)

(72) Inventor: Longinos De Dios Martín, Barcelona (ES)

(73) Assignee: CommScope Connectivity Spain, S.L., Madrid (ES)

(*) Notice: Subject to any disclaimer, the term of this patent is extended or adjusted under 35 U.S.C. 154(b) by 276 days.

(21) Appl. No.: 15/562,397

(22) PCT Filed: Mar. 26, 2016

(86) PCT No.: PCT/ES2016/070212
§ 371 (c)(1),
(2) Date: Sep. 27, 2017

(87) PCT Pub. No.: WO2016/156643
PCT Pub. Date: Oct. 6, 2016

(65) Prior Publication Data
US 2018/0358739 A1    Dec. 13, 2018

(30) Foreign Application Priority Data

Mar. 27, 2015   (ES) .................................. 201530418

(51) Int. Cl.
*H01R 13/52*    (2006.01)
*H01R 13/447*   (2006.01)
(Continued)

(52) U.S. Cl.
CPC ....... *H01R 13/5213* (2013.01); *H01R 13/447* (2013.01); *H01R 13/465* (2013.01);
(Continued)

(58) Field of Classification Search
CPC .................................................. H01R 13/5213
See application file for complete search history.

(56) References Cited

U.S. PATENT DOCUMENTS 3,666,996 A    5/1972   Brown
4,660,912 A *  4/1987   Tomek ................. H01R 13/447
                                                   174/67

(Continued)

FOREIGN PATENT DOCUMENTS

CN    201741918 U    2/2011
CN    201774068 U    3/2011
(Continued)

OTHER PUBLICATIONS

International Search Report and Written Opinion of the International Searching Authority for corresponding International Patent Application No. PCT/ES2016/070212 dated Jun. 2, 2016, 10 pages.

*Primary Examiner* — James Harvey
(74) *Attorney, Agent, or Firm* — Merchant & Gould P.C.

(57) ABSTRACT

A cover assembly (100) is disclosed that can be installed onto and removed from a telecommunications connector (200) without requiring the connector (200) from being removed from its mounted position and without requiring an associated cover plate (120) from being removed from its mounted position. The cover assembly (100) can include a base portion (150) that defines an opening that entirely surrounds a cover portion (110). In one example, the cover portion (110) is attached to the base portion (150) via a living hinge (118). In one aspect, the base portion (150) acts as a color cap while the cover portion (110) acts as a dust cover. In one example, the base portion (150) is provided without a cover portion (110) such that the cover assembly (100) simply acts as a color cap.

20 Claims, 12 Drawing Sheets

(51) Int. Cl.
  *H01R 13/50* (2006.01)
  *H01R 13/74* (2006.01)
  *H01R 24/64* (2011.01)
  *H01R 13/46* (2006.01)
  *H01R 107/00* (2006.01)

(52) U.S. Cl.
  CPC .......... *H01R 13/501* (2013.01); *H01R 13/745* (2013.01); *H01R 24/64* (2013.01); *H01R 2107/00* (2013.01)

(56) References Cited

U.S. PATENT DOCUMENTS

| | | | |
|---|---|---|---|
| 4,721,476 A | | 1/1988 | Zeliff et al. |
| 4,760,215 A | | 7/1988 | Cook et al. |
| 5,238,416 A | * | 8/1993 | Dickie ................ H01R 13/443 439/142 |
| 5,571,023 A | | 11/1996 | Anthony |
| 5,675,126 A | * | 10/1997 | Halvorsen ............ H01R 13/447 174/67 |
| 5,769,647 A | | 6/1998 | Tulley et al. |
| 6,247,849 B1 | | 6/2001 | Liu |
| 6,292,564 B1 | | 9/2001 | Cowan et al. |
| 6,425,694 B1 | | 7/2002 | Szilagyi et al. |
| 6,612,750 B1 | | 9/2003 | Bull et al. |
| 6,652,152 B2 | | 11/2003 | Yang et al. |
| 6,702,477 B1 | | 3/2004 | Ngo |
| 6,848,833 B1 | | 2/2005 | Kamarauskas et al. |
| 7,029,182 B2 | | 4/2006 | Ngo |
| 7,087,840 B2 | | 8/2006 | Herring et al. |
| 7,273,383 B1 | | 9/2007 | Bennett |
| 7,340,146 B2 | | 3/2008 | Lampert et al. |
| 7,676,133 B2 | | 3/2010 | Lampert et al. |
| 2002/0058432 A1 | | 5/2002 | Chen et al. |
| 2003/0081907 A1 | | 5/2003 | Malagrino, Jr. et al. |
| 2006/0110986 A1 | * | 5/2006 | King, Jr. ................ H01R 4/36 439/709 |
| 2006/0204200 A1 | | 9/2006 | Lampert et al. |
| 2007/0054521 A1 | | 3/2007 | John |
| 2011/0038581 A1 | | 2/2011 | Mudd et al. |
| 2013/0260582 A1 | * | 10/2013 | White .................. H01R 13/453 439/149 |
| 2018/0358739 A1 | * | 12/2018 | De Dios Mart N ........................ H01R 13/447 |

FOREIGN PATENT DOCUMENTS

| | | |
|---|---|---|
| EP | 1 189 085 A2 | 3/2002 |
| EP | 1 443 608 A2 | 8/2004 |
| FR | 2 893 454 A1 | 5/2007 |
| JP | 2006-126807 A | 5/2006 |
| KR | 2001-0100594 A | 11/2001 |
| WO | 97/44862 A1 | 11/1997 |

* cited by examiner

COVER ASSEMBLY FOR A TELECOMMUNICATIONS CONNECTOR

CROSS-REFERENCE TO RELATED APPLICATION

This application is a National Stage Application of PCT/ES2016/070212, filed on Mar. 26, 2016, which claims the benefit of Spanish Patent Application No. P201530418, filed on Mar. 27, 2015, the disclosures of which are incorporated herein by reference in their entireties. To the extent appropriate, a claim priority is made to each of the above disclosed applications.

TECHNICAL FIELD

The present disclosure relates to color caps attached to telecommunications connectors that include a dust caps for protecting an unused telecommunications connector.

BACKGROUND

Electrical connectors, for example RJ-type connectors, are useful for providing wall sockets where electronic data cables can be terminated and mating electrical plugs can be inserted. A problem with such electrical connectors can occur when dust, dirt or other contaminants come into contact with electrically conductive elements inside the connector. Such contaminants may cause corrosion, unintended conduction or adhesion of components that impedes their movement. Ingress of contaminants into the electrical connector may be particularly likely when the connector is placed in a wall cavity. This may be the case when building works generate abrasions and contaminants, for example.

Some electrical connectors, such as some RJ-type connectors, are assembled in such a way that an exposed cavity containing one or more conductive elements of the electrical connector is not covered once installed. This exposed cavity may be prone to accumulation of contaminants. It is generally desirable to overcome or ameliorate one or more of the above described difficulties, or at least provide a useful alternative.

Another concern regarding connectors is the provision of identification means on the connectors such that a user can more quickly identify an appropriate connector. Although some connectors are provided with color caps for this purpose, many are installed one the connector in such a way that their removal and replacement the field is difficult or impossible without removing the connector from its mounting location.

SUMMARY

A cover assembly is disclosed. The cover assembly is for covering a jack receptacle located at a front face of a telecommunications connector, the cover assembly includes: a base portion including at least one attachment feature for securing the base portion to the front face of the telecommunications connector, the base portion having a front face that defines an opening; a cover portion connected to the base portion via a living hinge, the cover portion being movable between a closed position and an open position: when the cover portion is in the closed position, a front face of the cover portion covers the opening and is coplanar with the front face of the base portion; when the cover portion is in the open position, the opening is at least partially uncovered by rotating the cover portion about the living hinge with the at least a portion of the base portion remaining unobscured by the cover portion.

A telecommunications system is disclosed. The system includes: a connector defining a jack receptacle located at a front face of the connector; a mounting panel to which the connector is mounted; a cover plate having a front face defining an opening, the cover plate being placed in a mounted position; a cover assembly removably secured to the connector and located at least partially within the covering plate opening. The cover assembly is similar to that as described above.

A method of attaching a cover assembly for a telecommunications jack is disclosed. The method can include the steps of: providing a connector defining a jack receptacle located at a front face of the connector; mounting the connector to a mounting panel; mounting a cover plate that has a front face defining an opening to a surrounding structure; providing a cover assembly of the type described above; and mounting the cover assembly to the connector.

DESCRIPTION OF THE DRAWINGS

Non-limiting and non-exhaustive embodiments are described with reference to the following figures, which are not necessarily drawn to scale, wherein like reference numerals refer to like parts throughout the various views unless otherwise specified.

DETAILED DESCRIPTION

Figure 1:
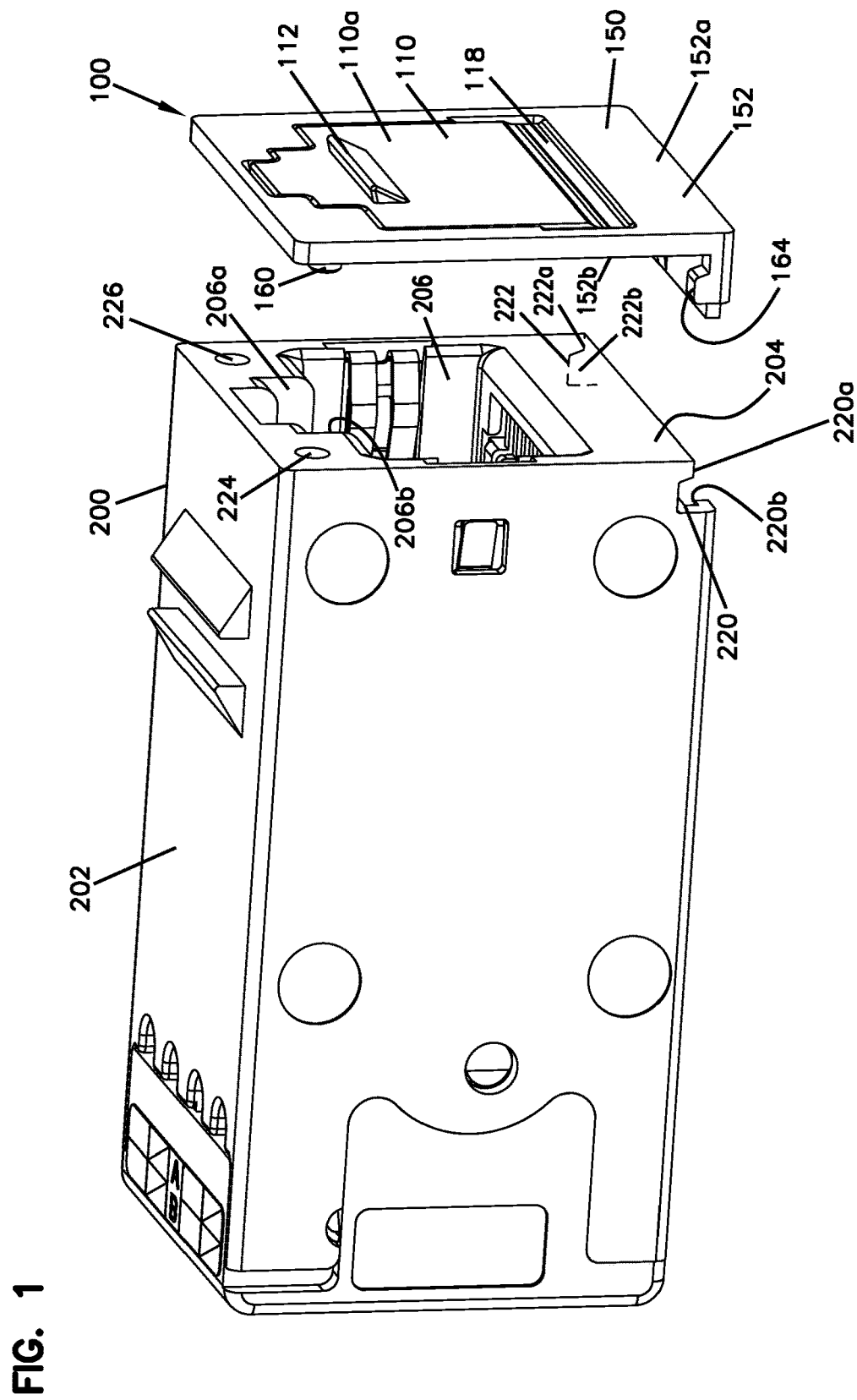
FIG. 1 is a front perspective view of a connector and a separated connector cover assembly having a color cap and a dust cap, the assembly having features that are examples of aspects in accordance with the principles of the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Referring now to FIGS. 1-4, an example cover assembly 100 is shown. Cover assembly 100 is for providing a visual port indication to identify they type of connector 200 (and/or type of service) to which the assembly 100 is attached. In this manner, an array of connectors 200 can be provided with differently colored cover assemblies 100 such that the purpose or identity of each connector can be easily understood by a user (e.g. a blue color cover 100 for a first data connector, a green color cover 100 for a second data connector, and a red color cover 100 for a telephone connector). Cover assembly 100 is also for protecting a jack receptacle 206 of the connector 200 from dust and other contaminants when the modular connector is not engaged with a plug 300. One type of modular connector suitable for use with cover assembly 100 is an RJ type connector, for example, an RJ45 type connector which can be connected to a cable 201. In one aspect, the jack receptacle 206 includes contact springs 208 on the inside of the jack for contacting a mating plug (not shown). One skilled in the art will appreciate that the cover assembly 100 may be used in conjunction with a wide variety of modular type connector jacks, for example fiber optic adapters. In the embodiment shown, cover assembly 100 includes a cover portion 110 rotatably connected to a base portion 150 via a living hinge 118 to open or close an opening 120 defined by the base portion that corresponds to the shape of the jack receptacle 206. As shown, the opening 120 is entirely circumscribed by the base portion 150 such that the opening 120 is an enclosed opening.

As most easily viewed at FIGS. 7 to 10, the cover portion 110 has a front face 110a and a rear face 110b. When the cover assembly 100 is mounted on a jack 200, the cover portion 110 is oriented such that the front face 110a is outward facing while the rear face 110b faces towards the jack receptacle 206 in a main body 202 of the jack 200. Located on the front face 110a of the cover portion 110 is a handle 112 configured to allow a user to manipulate the cover portion 110 such that the cover assembly 100 can be moved from a closed position to an open position. The cover assembly 100 is shown as being in the closed position at FIGS. 1, 2, 4, 5 and 9-10, and as being in an open position at FIGS. 3, 6, 7, and 8. In the example embodiment shown, the handle 112 is configured to allow this action to be initiated by using a single phalange (i.e. a finger and/or a fingernail).

As shown, the cover portion 110 and the base portion 150 are connected to each other by a living hinge 118. By use of the term "living hinge" it is meant to mean a relatively thin, flexible hinge made from the same material as the cover portion 110 and the base portion 150. This configuration allows for the cover assembly 100 to be produced in a single manufacturing step, as no assembly of the base portion 150 and the cover portion 110 is required.

In one aspect, the cover portion 110 is provided with one or more securing features 116 that engage with the interior surfaces of the jack receptacle 206. Securing feature 116 is for retaining the cover portion 110 in the closed position and may also act as an alignment guide when moving the cover portion 110 from the open to the closed position. The securing feature 116 has a width w1 such that, when the cover portion 110 is moved to the closed position, the ends of the securing feature 116 frictionally engage with side walls 206a and 206a of the jack receptacle 206. Additional or alternative securing features may be provided, for example, the securing features disclosed in United States patent application publication 2013/0260582, the entirety of which is incorporated by reference.

In one aspect, the base portion 150 includes a main body 152 having a front face 152a and a rear face 152b. When the cover portion 110 is in the closed position with respect to the base portion 150, the front face 152a is flush (i.e. coplanar) with and faces in the same direction as the front face 110a of the cover portion 110. In one aspect, attachment features can be provided on the rear face 152b to secure the cover assembly 100 to the front face 204 of the jack 200. Examples of suitable attachment features can be most easily seen at FIG. 10, wherein it can be seen that the rear face 152b is provided with a pair of protrusions 160, 162 and a pair of locking features 164, 166. The connector 200 can be provided with recesses 224, 226 which respectively receive protrusions 160, 162 and can be provided with locking features 220, 222 which respectively engage with the locking features 164, 166.

As shown, the locking features 164, 166 are respectively each provided with a lock portion 164a, 166a and a recess portion 164b, 166b while the locking features 220, 222 are respectively each provided with a complementarily shaped lock portion 220a, 222a and a recess portion 220b, 222b. When engaged, the lock portions 164a, 166a engage with the recess portions 220b, 222b while the lock portions 220a, 222a engage with the recess portions 164b, 166b. As such, the locking features 164/220, 166, 222 lock the cover assembly 100 to the connector 200 such that the cover assembly is constrained from moving horizontally away from the front face 204 proximate the engaged locking features 164/220, 166/222 and is constrained from moving vertically in a direction from the engaged locking features 164/220, 166/222 towards the jack receptacle 206. The protrusions 160, 162 frictionally engage with the recesses 224, 226 to prevent the cover assembly 100 from moving horizontally away from the front face 204 and also prevent the cover assembly 100 from moving in any direction parallel to the plane defined by the front face 204.

To install the base portion 150 onto the front face 204 of the connector 200, the locking features 164, 166 can be first engaged with the locking features 220, 222 on the connector main body 202 and the cover assembly 100 can be rotated about the engaged locking features 164/220 and 166/222 such that the protrusions 160, 162 are pressed into the recesses 224, 226 located on the front face 204 of the connector 200. In this position, the locking features 164/220 and 166/222 are unable to disengage as long as one or both of the protrusions 160, 162 are engaged with the recesses 224, 226. Removal of the cover assembly 100 is the reverse of installation, such that the base portion 150 must first be pulled away at the end opposite the locking features 164, 166 to pull the protrusions 160, 162 out of recesses 224, 226. Once this step is completed, the base portion 150 can then be displaced downwardly in a direction towards the locking features 164, 166 to release the locking features 164, 166 from locking features 220, 222.

Figure 2:
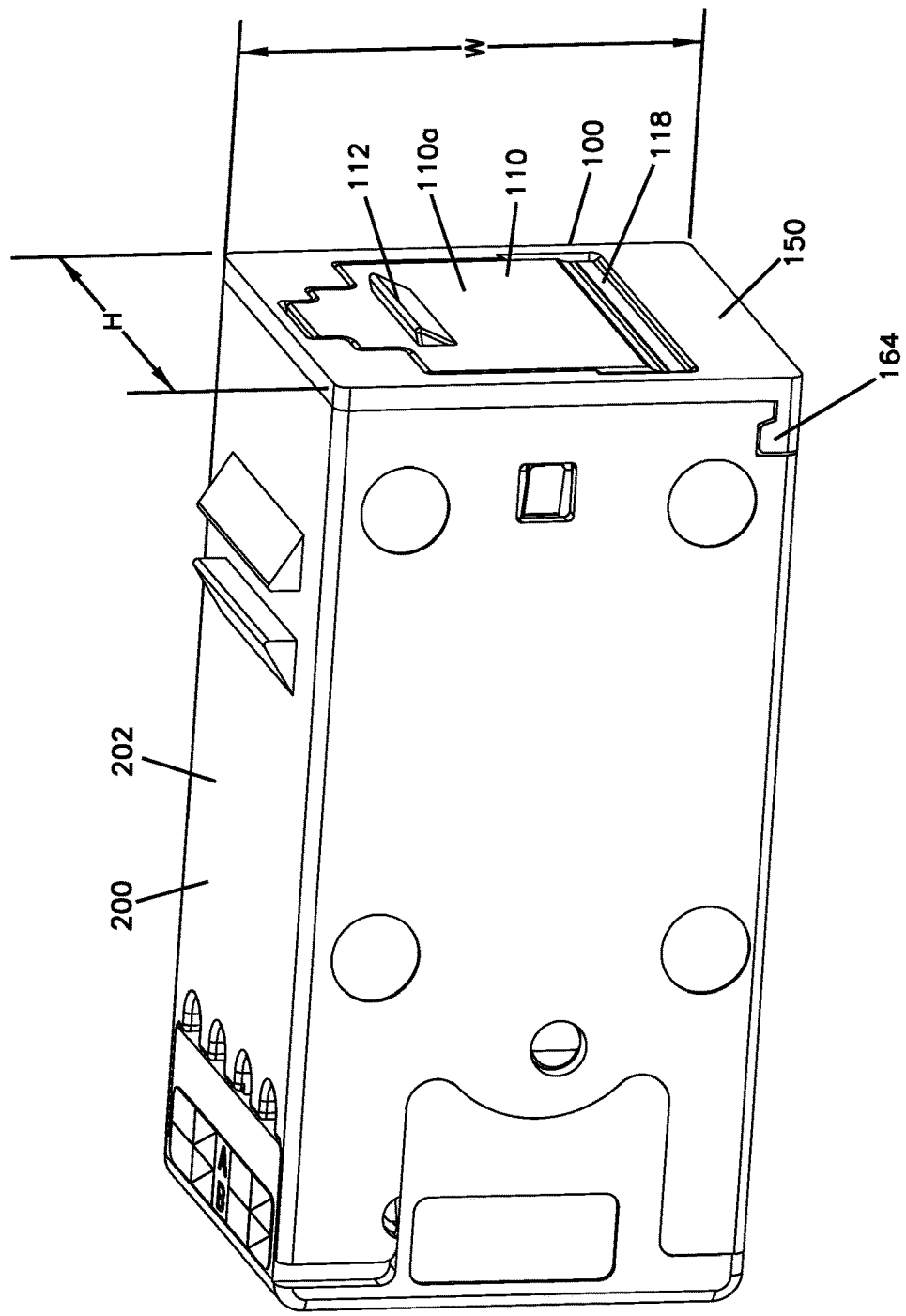
FIG. 2 is a front perspective view of the connector and cover assembly shown in FIG. 1, with the cover assembly shown as being mounted to the connector.
Figure 3:
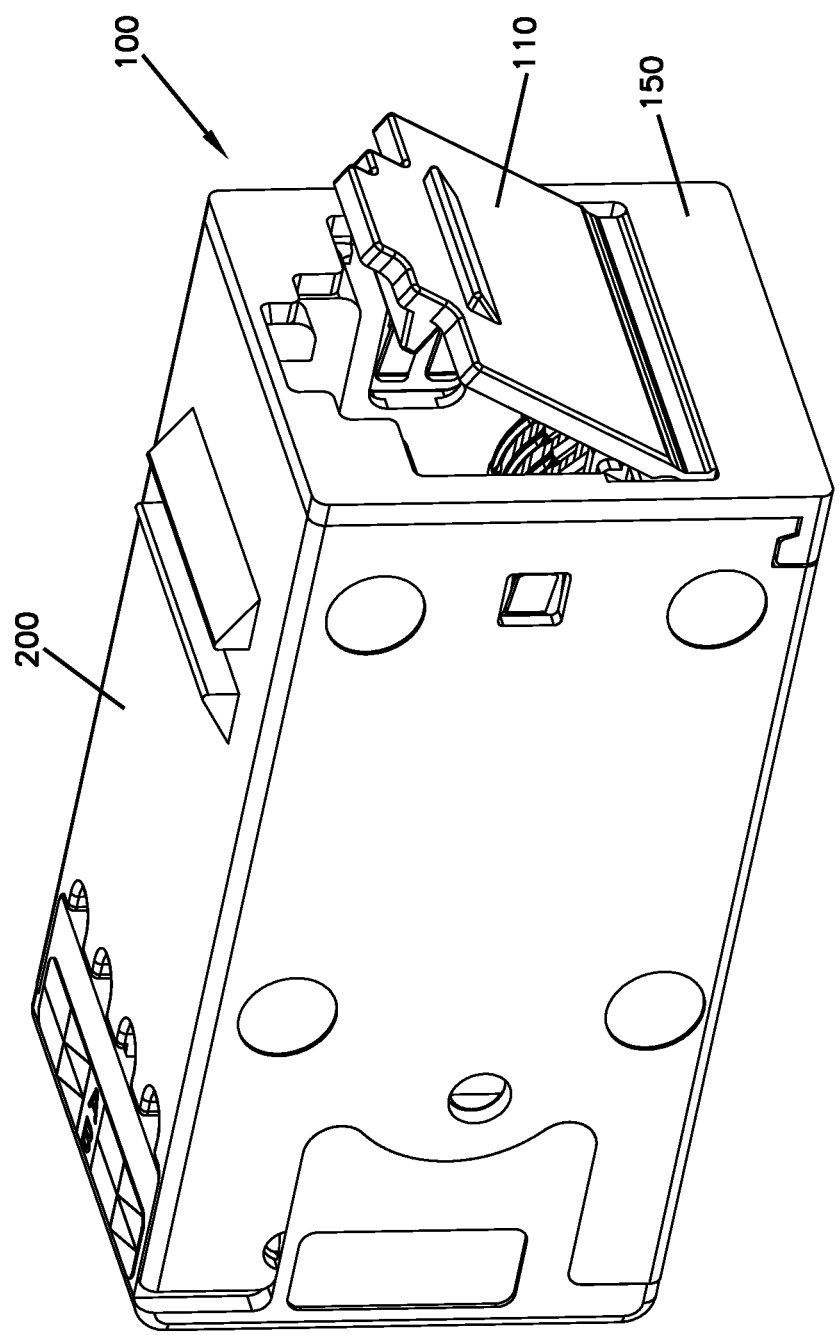
FIG. 3 is a front perspective view of the connector and cover assembly shown in FIG. 2, with the dust cap in a partially open position.
Figure 4:
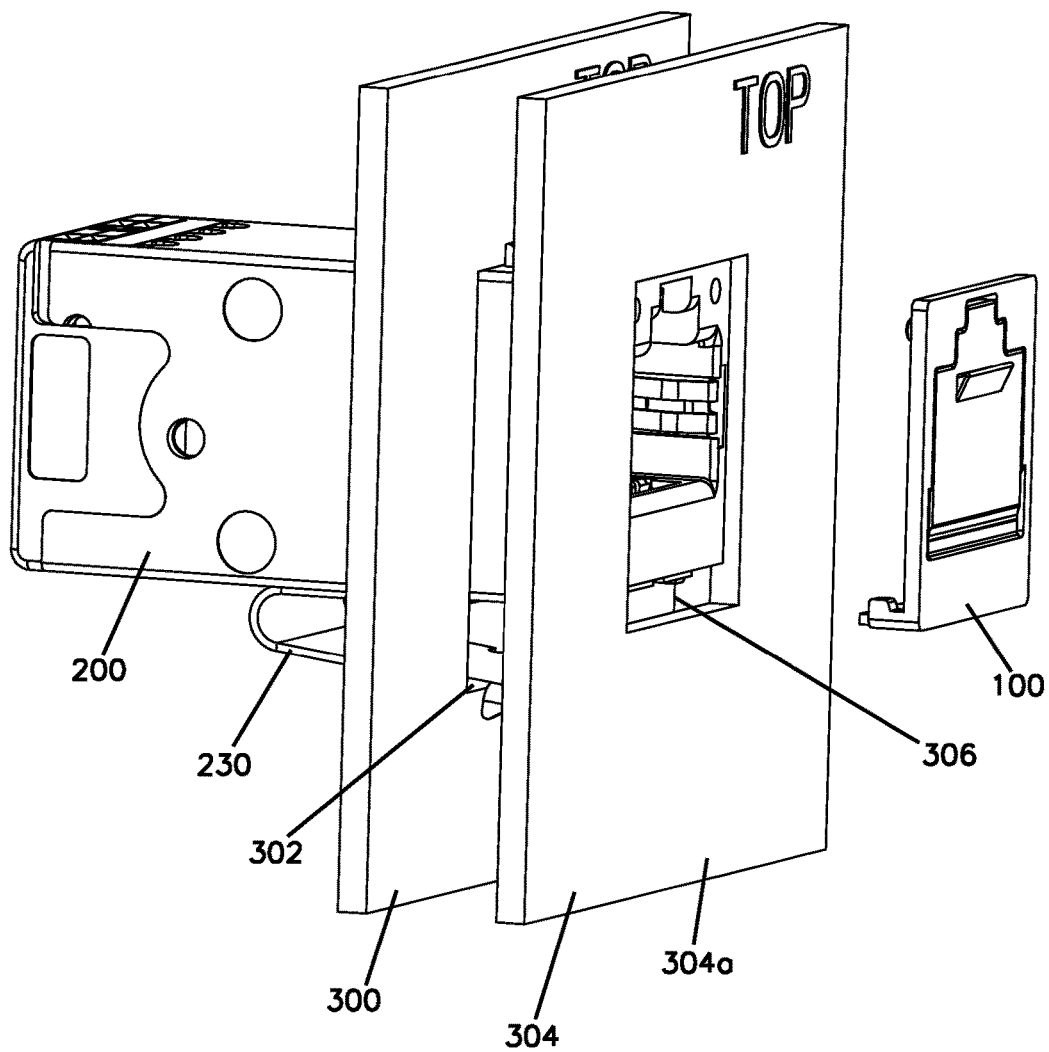
FIG. 4 is a front perspective view of the separated connector and cover assembly shown in FIG. 1, with the connector shown as being mounted to a mounting panel and a cover plate.
Figure 5:
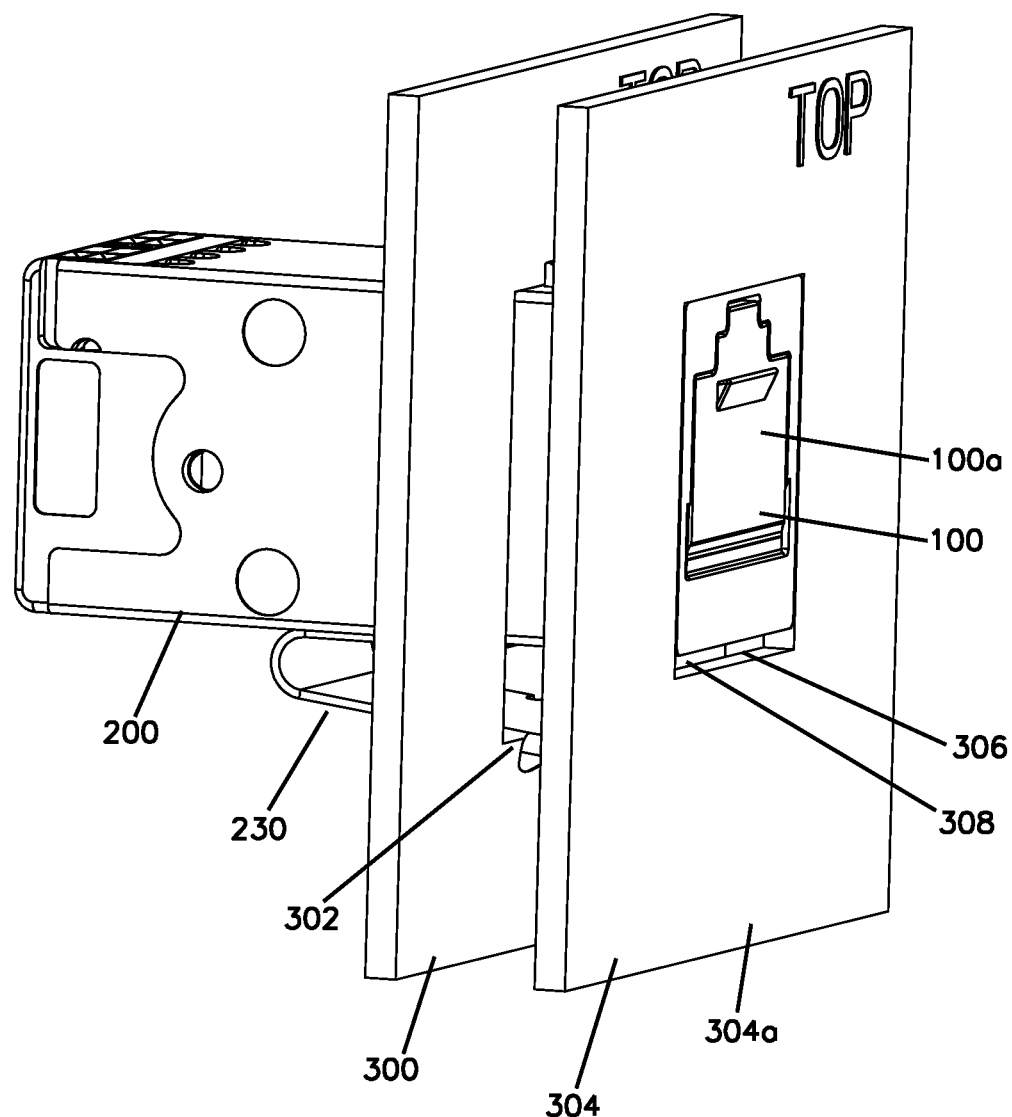
FIG. 5 is a front perspective view of the connector and cover assembly shown in FIG. 4, with the cover assembly shown as being mounted to the connector.

In the embodiment shown, the height H and width W of the base portion 150 and the height H and width W of the connector 200 are the same, as can be seen at FIGS. 2 and 3. This allows for the connector 200 to be installed into a mounting panel 300 and into a cover plate 304 with the cover assembly 100 already mounted to the connector 200. This mounted configuration is shown at FIG. 5, where it can be seen that the connector 200 is mounted through an opening 302 of the mounting panel 300 and is secured to the mounting panel 300 via a mounting clip 230 of the connector 200. The cover plate 304, which is typically mounted to a surrounding structure, also defines an opening 306 through which the cover assembly extends 100 such that the front face 110*a* of the cover assembly 100 and the front face 152*a* of the base portion are flush with a front face 304*a* of the cover plate 304. As also there is also a small clearance gap 308 between the bottom of the cover assembly 100/connector 200 and the opening 306, the cover assembly 100 can be easily removed from the connector 200 without requiring removal of the cover plate 304 or requiring removal of the connector 200 from the mounting panel 300. Likewise, the cover assembly 100 can be installed onto the connector 200 without requiring removal of the cover plate 304 or removal of the connector 200 from the mounting panel 300, as shown in FIGS. 4 and 5. This functionality represents a significant improvement over many prior art embodiments which cannot be replaced without removing the connector from the mounting panel and/or cover plate to facilitate replacement and over prior art embodiments which have dust covers or color caps that are larger than the body of the connector and can therefore prevent the connector from being able to be installed from either the rear or the front side of the mounting panel 300.

Figure 6:
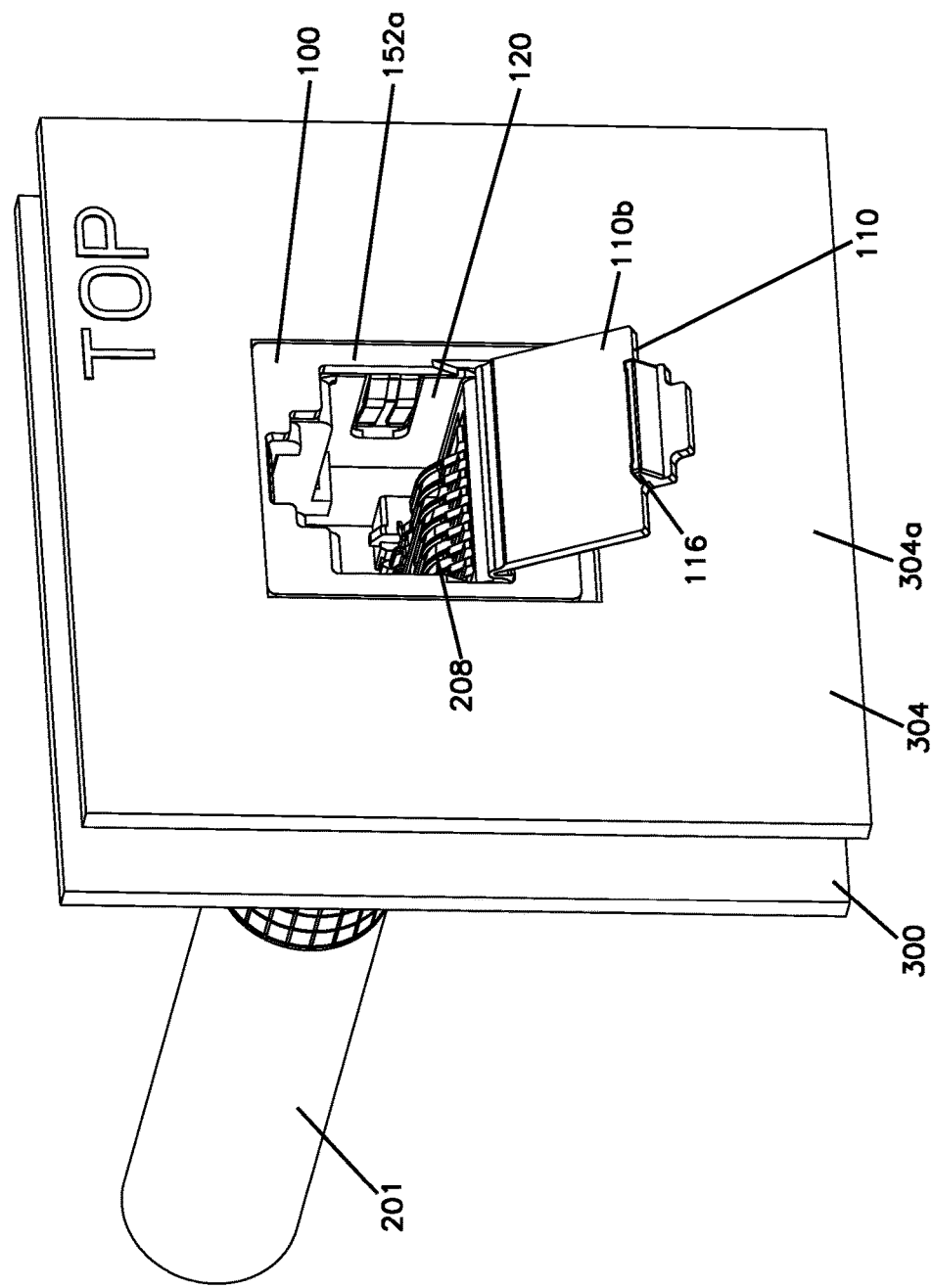
FIG. 6 is a front perspective view of the connector and cover assembly shown in FIG. 5, with the dust cap of the connector assembly being in an open position.
Figure 7:
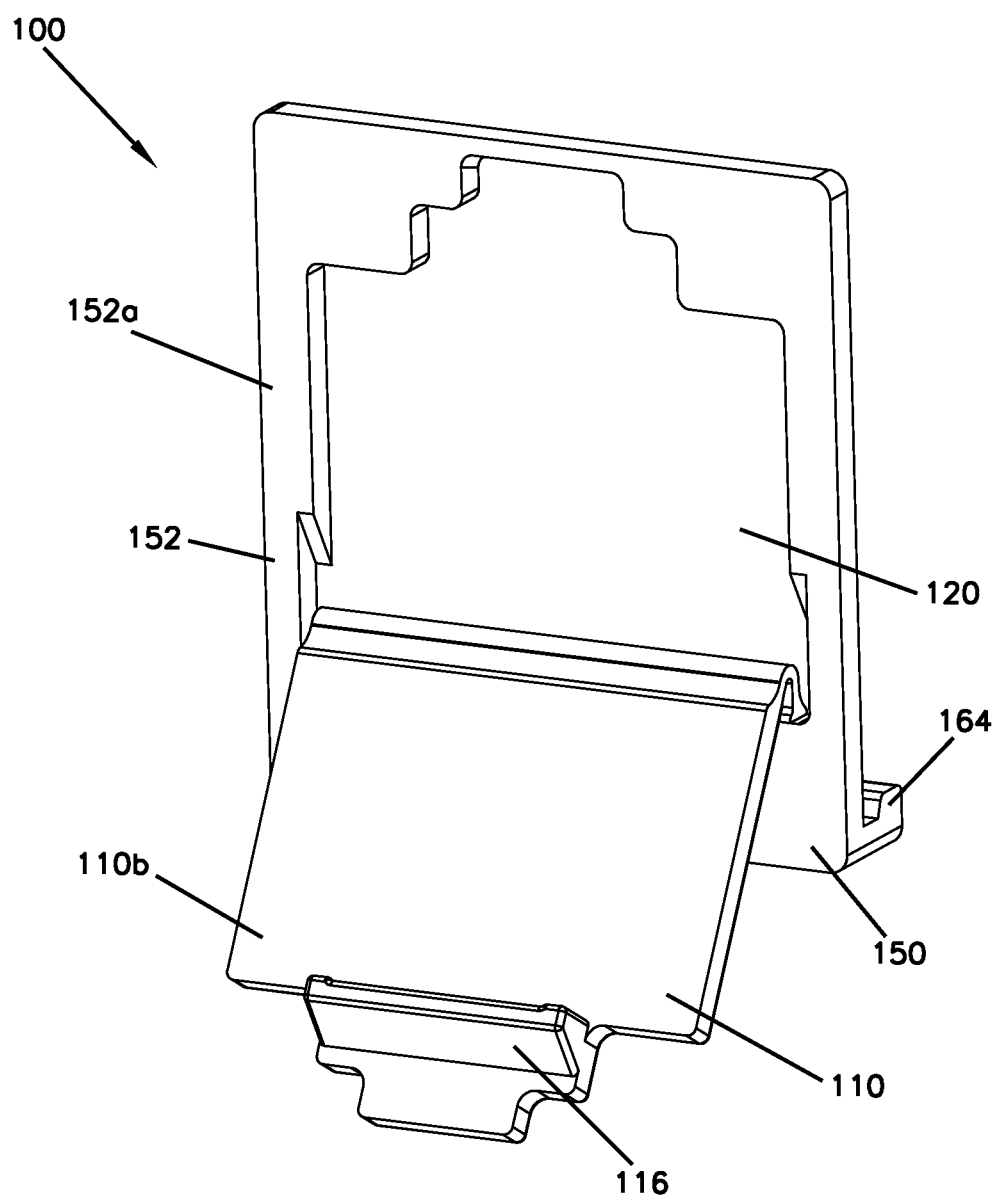
FIG. 7 is a front perspective view of the cover assembly shown in FIG. 1, with the dust cap shown being in a fully open position.
Figure 8:
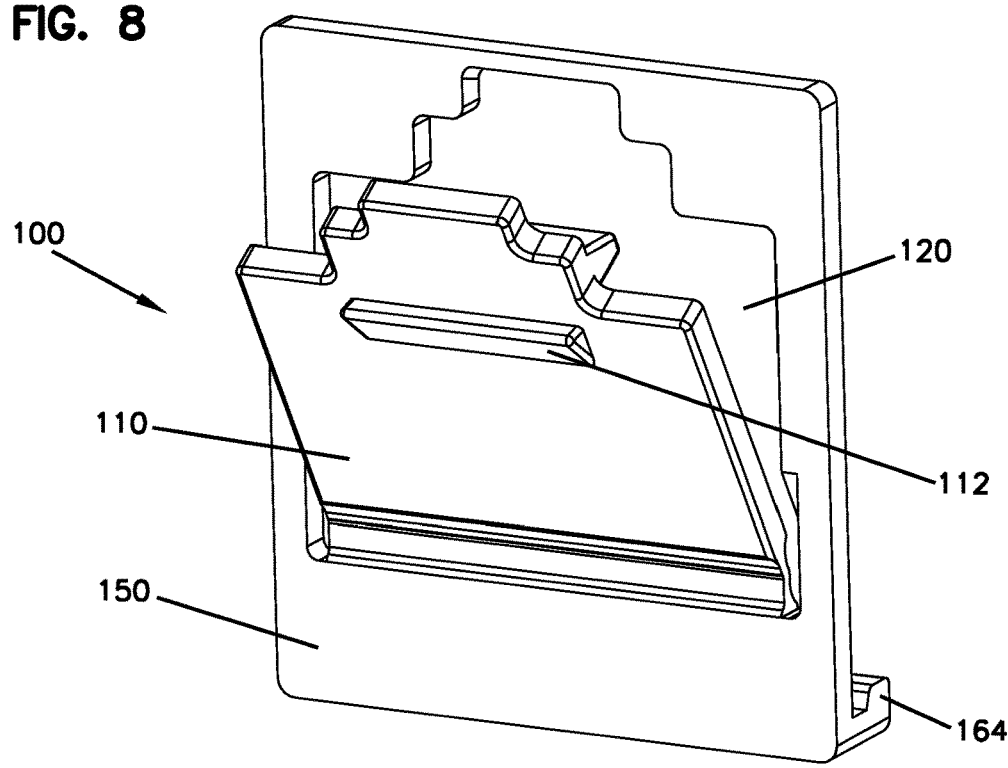
FIG. 8 is a front perspective view of the cover assembly shown in FIG. 1, with the dust cap shown being in a partially open position.
Figure 9:
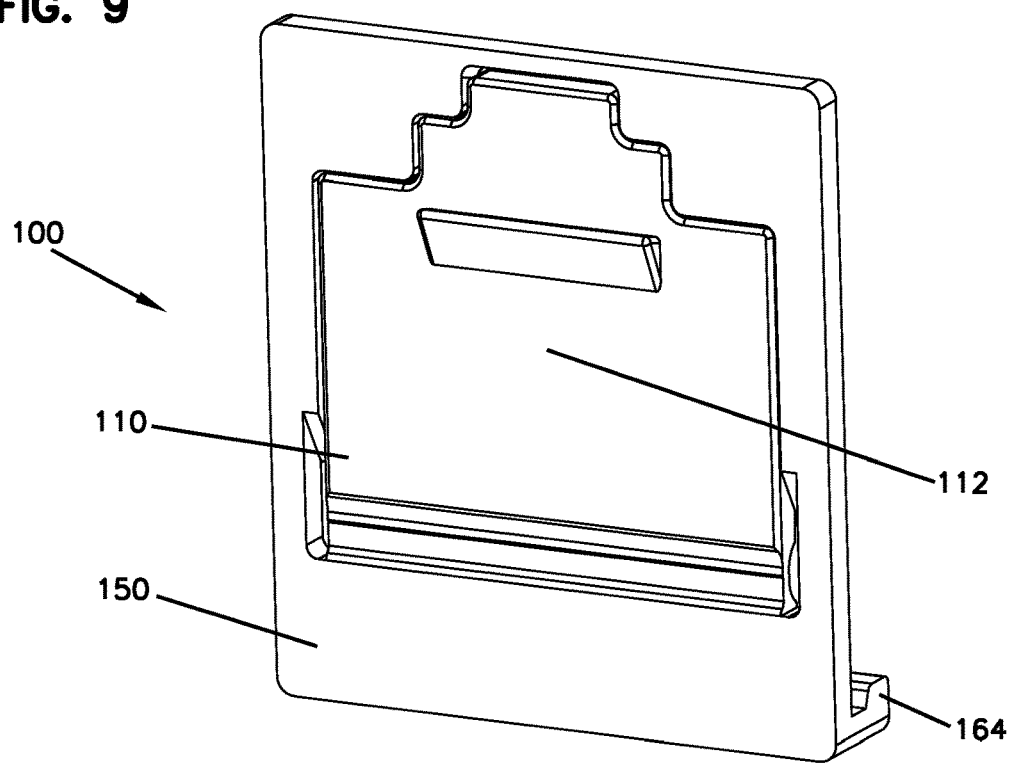
FIG. 9 is a front perspective view of the cover assembly shown in FIG. 1, with the dust cap shown being in a fully closed position.
Figure 10:
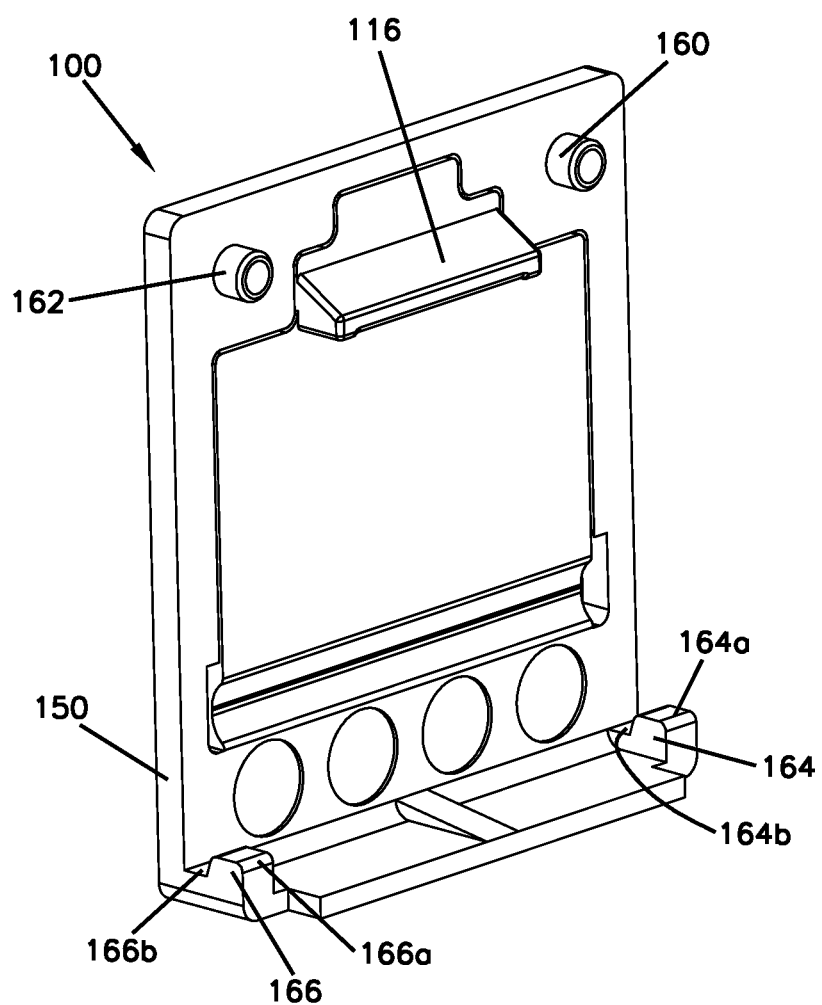
FIG. 10 is a rear perspective view of the cover assembly shown in FIG. 1, with the dust cap shown being in a fully closed position.
Figure 11:
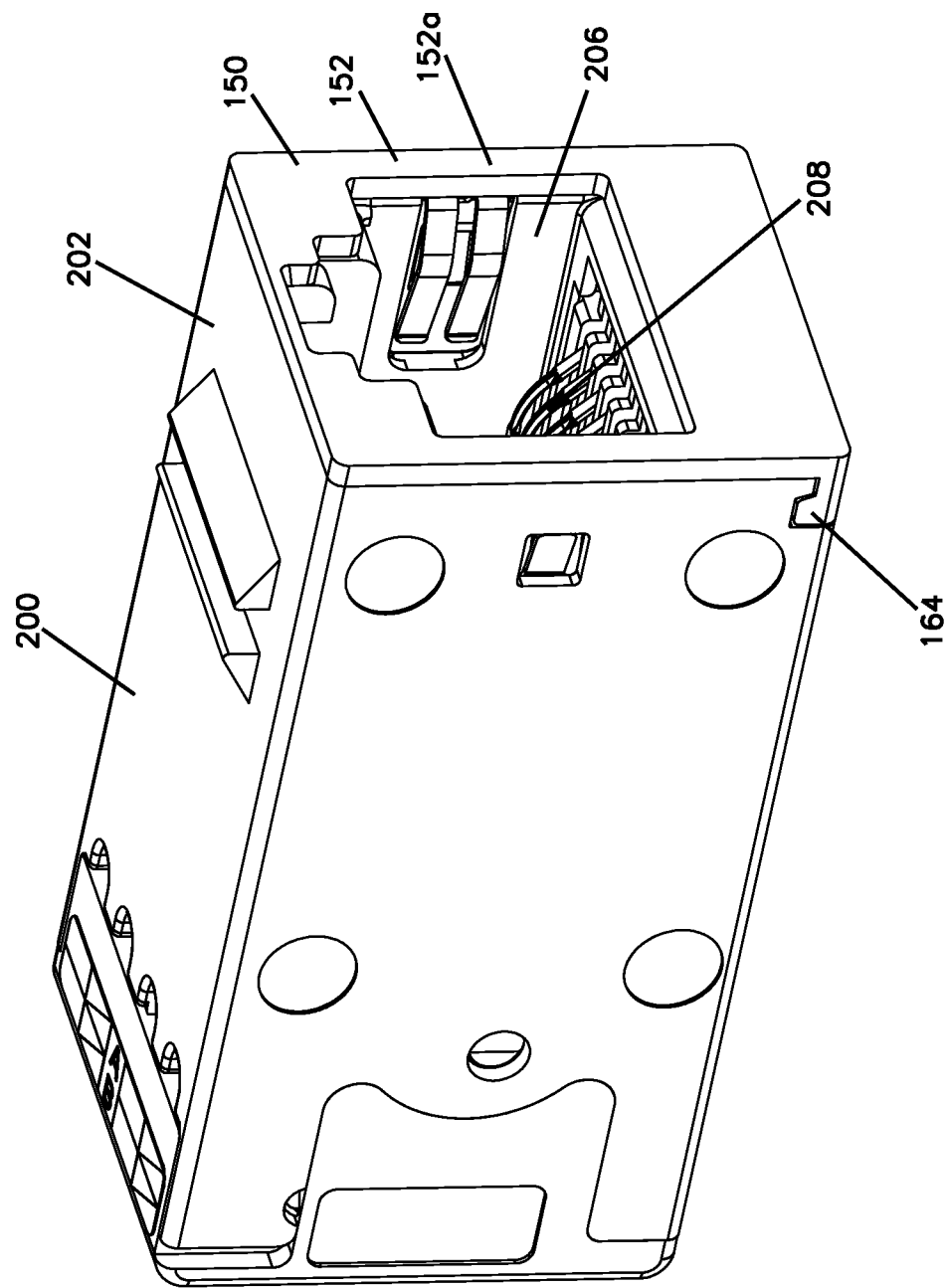
FIG. 11 is a front perspective view of a connector and a second embodiment of the cover assembly in which the cover portion is not provided, the cover assembly having features that are examples of aspects in accordance with the principles of the present disclosure.
Figure 12:
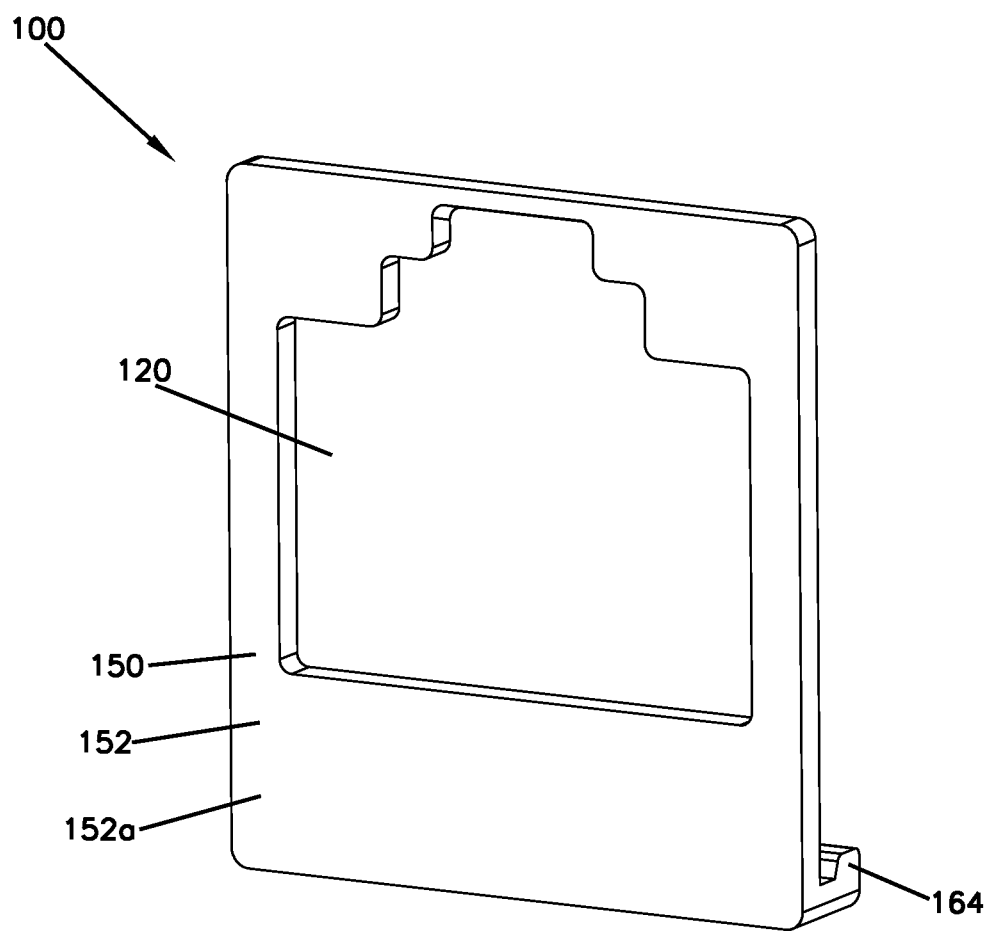
FIG. 12 is a front perspective view of the cover assembly shown in FIG. 11.
Figure 13:
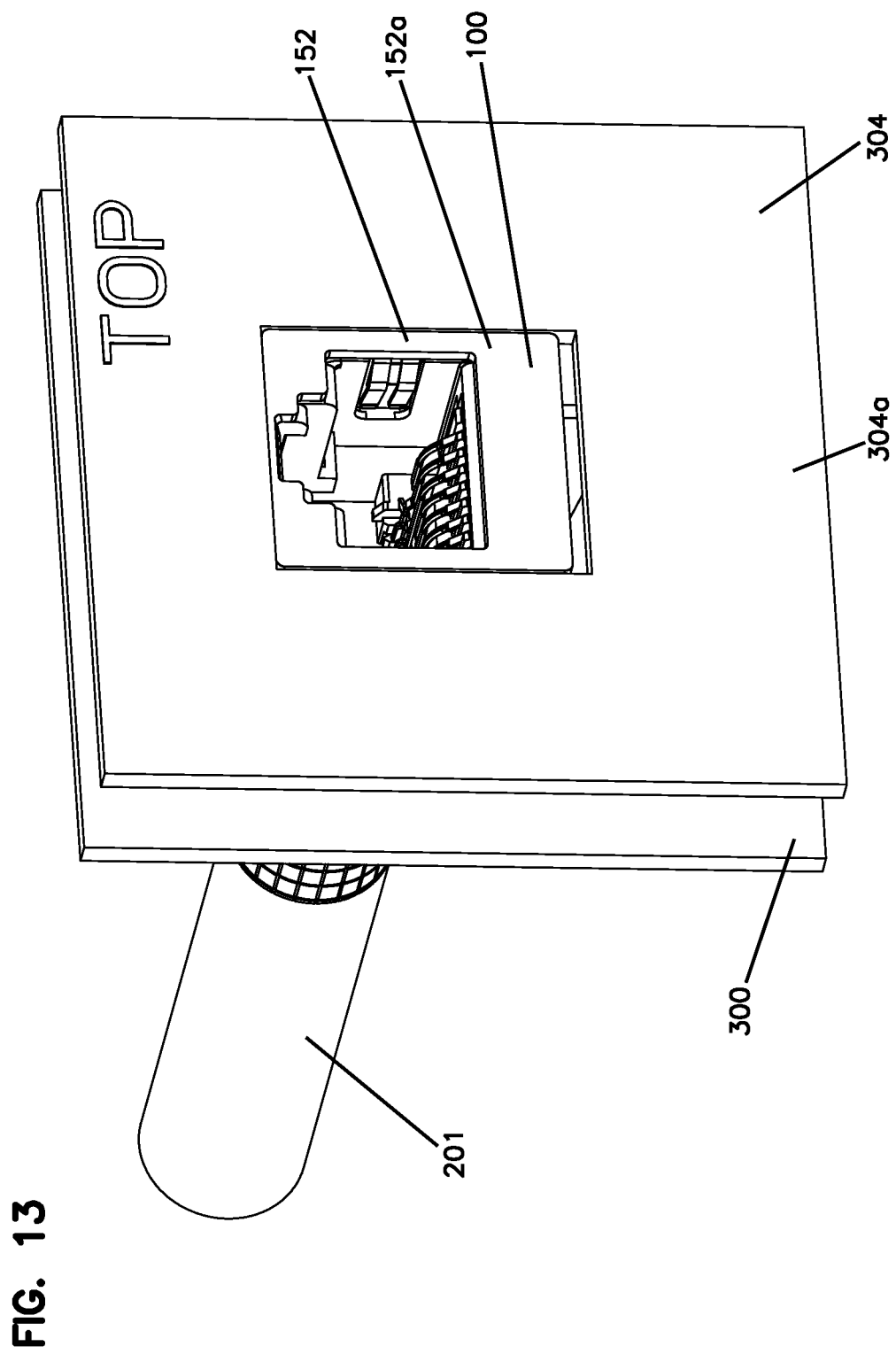
FIG. 13 is a front perspective view of the cover assembly shown in FIG. 11, with the connector shown as being mounted to a mounting panel and a cover plate.

In the embodiment shown, the rear face 152*b* has a surface area that is generally equal to the surface area defined by the front face 204 of the connector 200 (i.e. cover portion 110 and front face 204 have the same width and height H and W). As such, even when the cover portion 110 is moved to an open position, the base portion 150 remains visible to a user and unobscured by the cover portion 110, as can be seen at FIGS. 6 to 8. As such, the base portion 150 can be provided with a color (or other indicia) to function as a cap that provides a visual indication as to the connector identity or type. In some embodiments, the cover portion 110 is provided with the same color or indicia as the base portion 150, and can be integrally molded with the base portion 150 such that the cover assembly 100 is a formed as a single part. As such, the disclosed cover assembly 100 has the advantage of being an integrally formed, field replaceable unit that simultaneously serves as a dust cover and color cap. As shown at FIGS. 11-13, the cover assembly 100 can be provided without the cover portion 110 such that the cover assembly functions purely as a color cap.

In example embodiments, the components of the cover assembly 100 may be made of a plastic material, such as injection molded polyethylene and polypropylene. Other materials can be used.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the disclosure.

PARTS LIST 100 cover assembly
110 cover portion
110*a* front face
110*b* rear face
112 handle
116 securing feature
118 living hinge
120 opening
150 base portion
152 main body
152*a* front face
152*b* rear face
160 protrusion
162 protrusion
164 locking feature
164*a* lock portion
164 *b recess portion*
166 locking feature
166*a* lock portion
166*b* recess portion
200 jack receptacle
201 cable
202 main body
204 front face
206 recess
206*a* sidewall
206*b* sidewall
208 contact springs
220 locking feature
220*a* lock portion
220*b* recess portion
222 locking feature
222*a* lock portion
222*b* recess portion
224 recess
226 recess
230 mounting clip
300 mounting panel
302 opening
304 cover plate
304*a* front face
306 opening
308 gap
H height
W width

What is claimed is:

1. A cover assembly for covering a jack receptacle located at a front face of a telecommunications connector, the cover assembly comprising:
  (a) a base portion including at least one attachment feature for securing the base portion to the front face of the telecommunications connector, the base portion having a front face that defines an opening;
  (b) a cover portion connected to the base portion via a living hinge, the cover portion being movable between a closed position and an open position:
    i. when the cover portion is in the closed position, a front face of the cover portion covers the opening and is coplanar with the front face of the base portion;
    ii. when the cover portion is in the open position, the opening is at least partially uncovered by rotating the cover portion about the living hinge with the at least a portion of the base portion remaining unobscured by the cover portion.

2. The cover assembly of claim 1, wherein the at least one attachment feature includes a first protrusion extending from a back face of the base portion that is configured to be received in a corresponding recess of the connector front face.

3. The cover assembly of claim 2, wherein the at least one attachment feature includes a second protrusion.

4. The cover assembly of claim 1, wherein the at least one attachment feature includes a first locking feature proximate an end of the base portion that is configured to engage with a corresponding connector locking feature of the connector.

5. The cover assembly of claim 4, wherein the at least on attachment feature includes a second locking feature.

6. The cover assembly of claim 2, wherein the at least one attachment feature includes a first locking feature proximate an end of the base portion that is configured to engage with a corresponding connector locking feature of the connector.

7. The cover assembly of claim 6, wherein the first locking feature is prevented from disengagement with the connector locking feature unless the first protrusion is removed from the connector recess.

8. The cover assembly of claim 1, wherein the base portion has a height that is not more than a height of the connector front face and wherein the base portion has a width that is not more than a width of the front face of the connector for which the connector is configured.

9. The cover assembly of claim 1, wherein the cover portion includes a securing feature configured to engage with the jack receptacle to retain the cover portion in the closed position and wherein the front face of the cover portion includes a handle.

10. A telecommunications system comprising:
(a) a connector defining a jack receptacle located at a front face of the connector;
(b) a mounting panel to which the connector is mounted;
(c) a cover plate having a front face defining an opening, the cover plate being placed in a mounted position;
(d) a cover assembly removably secured to the connector and located at least partially within the covering plate opening, the cover assembly comprising:
  i. a base portion including at least one attachment feature for securing the base portion to the front face of the connector, the base portion having a front face that defines an opening and that is coplanar with the cover plate front face;
  ii. a cover portion connected to the base portion via a living hinge, the cover portion being movable between a closed position and an open position:
    1. when the cover portion is in the closed position, the front face is coplanar with the front face of the base portion; and covers the opening and the jack receptacle;
    2. when the cover portion is in the open position, the opening is at least partially uncovered by rotating the cover portion about the living hinge with the at least a portion of the base portion remaining unobscured by the cover portion.

11. The telecommunications system of claim 10, wherein the cover assembly can be attached to and removed from the connector without removing the connector from the mounting panel.

12. The telecommunications system of claim 10, wherein the cover assembly can be attached to and removed from the connector without requiring removal of the cover plate from the mounted position.

13. The telecommunications system of claim 10, wherein the cover assembly can be attached to and removed from the connector without requiring removal of the cover plate from the mounted position and without removing the connector from the mounting panel.

14. The telecommunications system of claim 12, wherein the at least one attachment feature includes a first protrusion extending from a back face of the base portion that is configured to be received in a corresponding recess of the connector front face.

15. A telecommunications system comprising:
(a) a plurality of connectors each defining a jack receptacle located at a front face of the connector;
(b) a mounting panel to which the connectors are mounted;
(c) a cover assembly removably secured to each of the connectors, the cover assembly comprising:
  i. a base portion including at least one attachment feature for securing the base portion to the front face of the connector, the base portion having a front face that defines an opening;
  ii. a cover portion connected to the base portion via a living hinge, the cover portion being movable between a closed position and an open position:
    1. when the cover portion is in the closed position, the front face is coplanar with the front face of the base portion and covers the opening and the jack receptacle;
    2. when the cover portion is in the open position, the opening is at least partially uncovered by rotating the cover portion about the living hinge with the at least a portion of the base portion remaining unobscured by the cover portion
    3. wherein each of the cover assemblies is provided with a color and there is at least one different cover assembly from at least one other of the plurality of cover assemblies.

16. The telecommunications system of claim 10, wherein the at least one attachment feature includes a first locking feature proximate an end of the base portion that is configured to engage with a corresponding connector locking feature of the connector.

17. The telecommunications system of claim 16, wherein the at least on attachment feature includes a second locking feature.

18. The telecommunications system of claim 14, wherein the at least one attachment feature includes a first locking feature proximate an end of the base portion that is configured to engage with a corresponding connector locking feature of the connector, wherein the first locking feature is prevented from disengagement with the connector locking feature unless the first protrusion is removed from the connector recess.

19. A telecommunications system comprising:
(a) a plurality of the cover assemblies of claim 1, each of which is attached to a connector wherein each of the cover assemblies is provided with a color that is different from at least one other of the plurality of cover assemblies.

20. The telecommunications system of claim 10, wherein the base portion has a height that is not more than a height of the connector front face and wherein the base portion has a width that is not more than a width of the front face of the connector.

* * * * *

UNITED STATES PATENT AND TRADEMARK OFFICE
CERTIFICATE OF CORRECTION

PATENT NO. : 10,522,939 B2
APPLICATION NO. : 15/562397
DATED : December 31, 2019
INVENTOR(S) : Longinos De Dios Martin Page 1 of 1

It is certified that error appears in the above-identified patent and that said Letters Patent is hereby corrected as shown below:

In the Specification

Column 1, Line 12: "a claim priority" should read --a claim of priority--

In the Claims

Column 7, Line 12, Claim 5: "the at least on" should read --the at least one--

Column 7, Line 51, Claim 10: "base portion; and" should read --base portion and--

Column 8, Line 44, Claim 17: "the at least on" should read --the at least one--

Column 8, Line 56, Claim 19: "to a connector wherein" should read --to a connector, wherein--

Signed and Sealed this
Twenty-seventh Day of April, 2021

Drew Hirshfeld
*Performing the Functions and Duties of the
Under Secretary of Commerce for Intellectual Property and
Director of the United States Patent and Trademark Office*